Oct. 2, 1962  E. J. BLIGARD  3,056,569
AIRPLANE ENGINE SUSPENSION SYSTEM
Filed Sept. 29, 1954  3 Sheets-Sheet 3
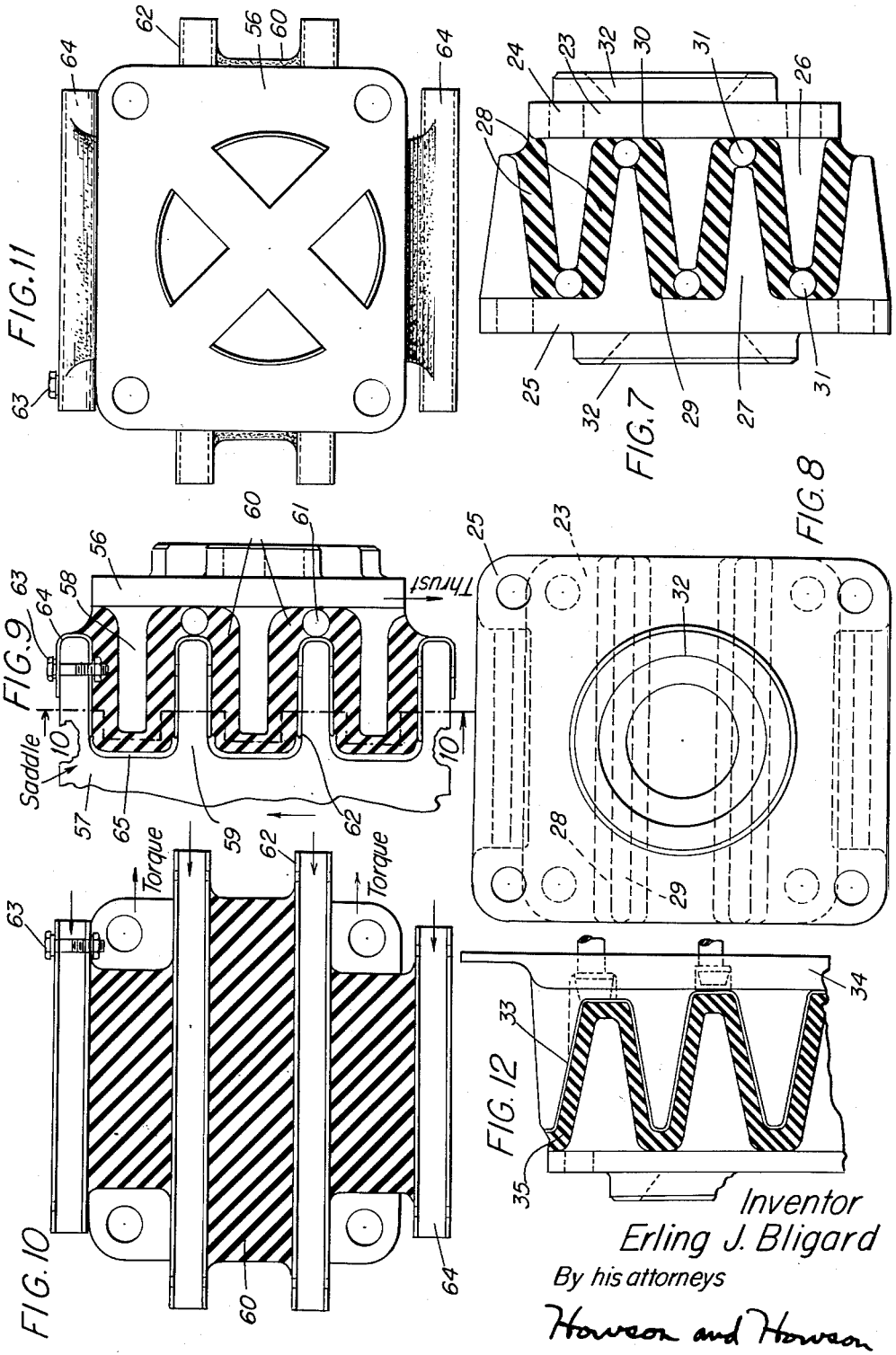
Inventor
Erling J. Bligard
By his attorneys
Howson and Howson United States Patent Office 3,056,569
Patented Oct. 2, 1962

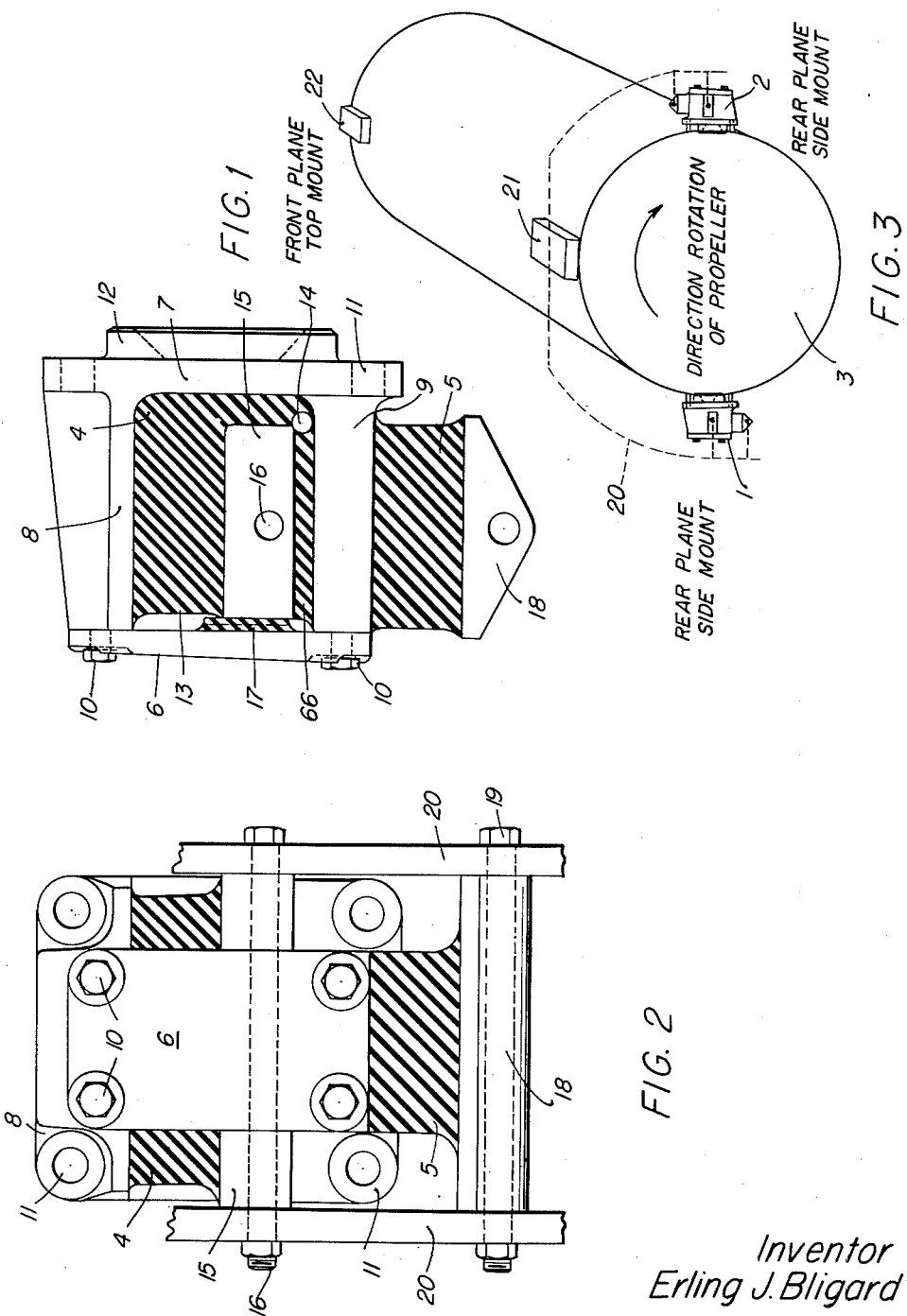

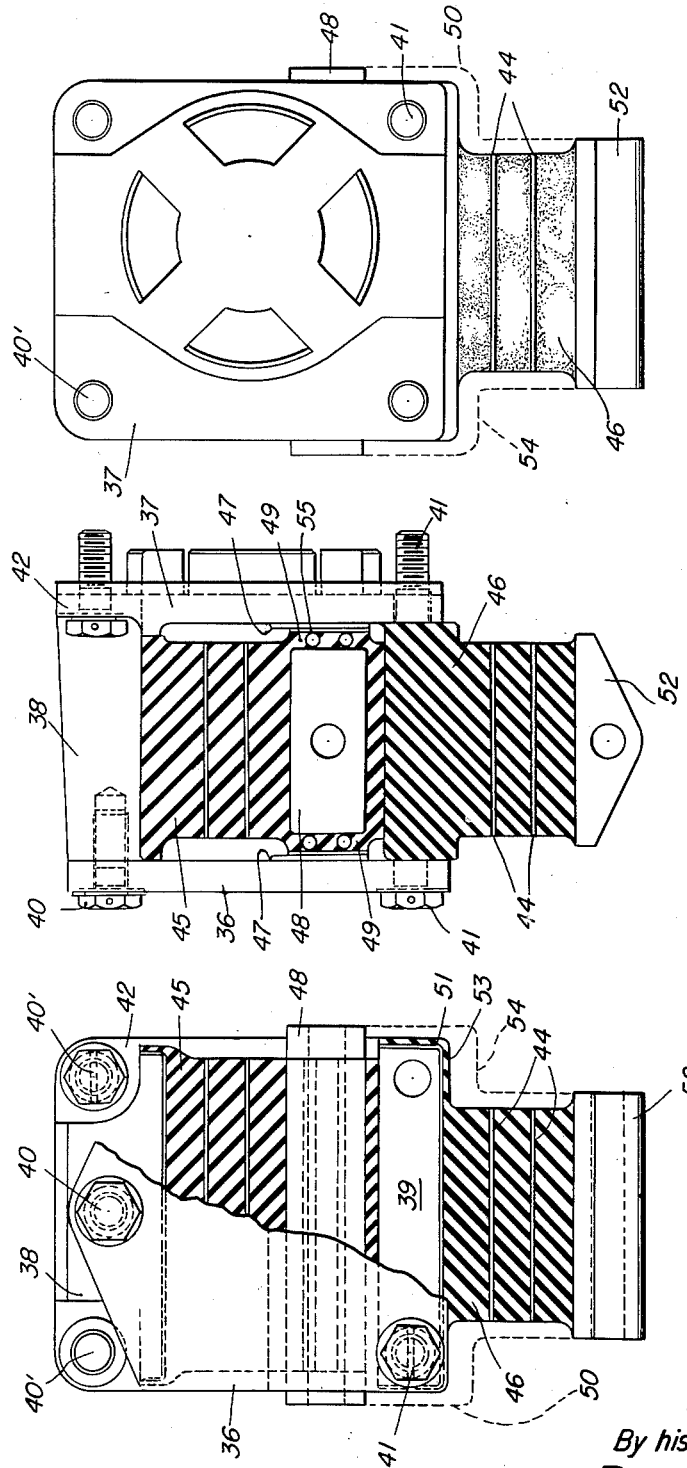

3,056,569
AIRPLANE ENGINE SUSPENSION SYSTEM
Erling J. Bligard, East Haven, Conn., assignor, by mesne assignments, to Textron Inc., a corporation of Rhode Island
Filed Sept. 29, 1954, Ser. No. 459,034
8 Claims. (Cl. 248—5)

This invention relates to a mount system for an airplane engine and the mounts composing same. More specifically the invention relates to a suspension for a turbo-propeller engine in an airplane and the individual vibration isolators or mounts in the suspension. The problems of isolating a turbo-propeller engine in an airplane with regard to shock and vibration are greater than when an ordinary piston engine is used. While the main vibrations and shocks are not changed in character, the turbo-propeller engine is often much heavier and more powerful. It may weigh several tons. As a result the vibration forces generated by the propeller are much larger. The mounting of such a heavy vibratory engine and propeller so as to prevent transmission of their vibrations to the airplane and at the same time to protect the engine and plane against transitory shock due to maneuvering of the plane, etc., has proved to be more than the usual piston engine suspensions can handle. Besides the relatively higher power of the engine and the heavier weight of other equipment required, turbo-propeller engines occupy more space and leave proportionately less space for the large engine mounts required. I have invented a suspension and mounts in which the mounts have their functions so interrelated and arranged that they can handle the engine without a proportionate increase in size.

Furthermore it sometimes occurs that the structure of an airplane is not designed to take out the forces at the points and in the directions which the ordinary mount system might prefer. My suspension system is capable of taking forces out at points and in directions necessitated by the structure of the airplane as distinguished from the convenience of the engine.

It is characteristic of the new mounts and their arrangement that all the major forces to be protected against are taken by rubber in compression in the direction of the main axis of each mount and that each such major force is taken solely by mounts acting in their main axes. Thus each mount is relieved of taking any major force in shear. It will also be noted that at least some of my major mounts have a plurality of rubber elements connected in parallel but located in a "stacked" relation, i.e. one behind the other in the direction of the main axis of the mount.

In the drawings:

FIG. 1 is a view in rear elevation of a simple embodiment of my novel side mount for taking the torque forces of a turbo-propeller airplane engine at the left side of the engine as viewed from the rear.

FIG. 2 is a view in elevation from the left outside of the side mount of FIG. 1 showing the connections to the airplane.

FIG. 3 is a diagram showing the manner in which the mounts of my suspension are connected to the engine, the curved arrow indicating the direction of rotation of the rotor and propeller of the engine.

FIG. 4 is a view in rear elevation of the preferred embodiment of my side mount including snubbing and damping means.

FIG. 5 is a view in elevation from the left outside of the side mount of FIG. 4 with the front plate partly broken away and the location of the saddle connection to the airplane shown in dotted lines at the lower part of the view.

FIG. 6 is a view in elevation of the back piece of the mount of FIGS. 3 and 4, this being the side which is to face toward the engine.

FIG. 7 is a view partly in section, with the fore-and-aft direction vertical, of one form of my novel thrust mount to be associated with the side mounts of FIGS. 1 and 2 or FIGS. 4, 5 and 6.

FIG. 8 is a top plan view of the thrust mount of FIG. 7.

FIG. 9 is a view in side elevation, similar to FIG. 7, of a modified form of thrust mount.

FIG. 10 is a view in horizontal cross-section of the thrust mount of FIG. 9 taken on the line 10—10 of that figure.

FIG. 11 is a bottom view of the mount of FIGS. 9 and 10 showing the back plate which attaches to the engine and the attachments to the saddle.

FIG. 12 is a further modified form of the thrust mount shown in FIG. 7.

The problem of mounting a turbo-propeller engine in an airplane is difficult compared to mounting a piston engine in an airplane, primarily because the turbo-propeller, i.e. turbo-prop engine, is usually so much more powerful and longer and because there is less space in which to place the mounts. Heretofore the practice has been to place mounts in a single plane where each mount must isolate the engine with respect to deflections in more than one direction. Owing to the greater length this is impractical with most turbo-prop engines.

The problem becomes one of reconciling several conflicting requirements. Of course, the requirements as to the vibration frequencies to be handled must be met. There are limitations on the motion of the engine imposed by factors outside the mount system. It is a fact, as already mentioned, that the space allowed in the airplane for the mounts is generally not adequate when the turbo-propeller engine situation is considered. The structure of the airplane is not capable of taking out the forces at the points and in the directions which the mount system might prefer. This is also true of the engine structure. Furthermore the thermal expansion of these engines is high, which means that operational temperature changes may cause appreciable change in engine length between the rear and front points or planes of attachment and between the two rear mounts.

I have found that the problem of the turbo-prop engine is of such nature that it can be overcome by a suspension of a different kind. It is desirable to place the elastic center of the complete suspension, including the engine, in proximity to the installed center of gravity, taking into account the stiffness of the supporting structure of the airplane. I have determined the stiffness of the individual mountings in the various principal directions on the basis of the above facts.

Assuming that the torque load, i.e. torsion, about the engine center is to be taken out the rear of the engine at the sides, and the fore-and-aft thrust and inertial loads can be taken out at the top rear of the engine, I prefer to use a top forward mount to take care of vertical and side motion due to inertia loads caused by maneuvering of the airplane. This forward mount is not expected to take out any torsion or thrust.

There are side mounts at the rear mounting plane of the engine in my suspension. They are used to give the engine vertical support at the rear and also to give the engine torsional support about its fore-and-aft axis. In FIG. 3 of the drawings there is shown one resilient side mount at each side of the engine at the rear mounting plane. The torsional forces on these two mounts are large in relation to the gravity forces. These mounts also take out horizontal forces. These horizontal forces are side forces at right angles to the major mount axis and could occur due to maneuver conditions of the airplane. Unfortunately the space available for these side mounts in this machine is greater in the direction of vertical thrust than it is at right angles thereto. Since the load is extremely high and the space relatively small, I have devised the following: I have noted that there seems to be no advantage in using rubber in shear as against rubber in compression if the same stiffnesses are achieved. Also, the volume of rubber needed to take care of a given load at the same strain is less with rubber in compression than with rubber in shear for most practical rubber configurations. I noted that in the present situation I needed relatively large deflections associated with high stiffnesses. By taking out the forces in one direction in one mount in compression and in a second direction at right angles thereto in another mount also in compression, I found that each mount could be adapted to relieve the other of responsibility in the shear direction of the rubber. The size of the forces made it necessary to supply considerable area to maintain low stresses in the rubber. I reconciled the requirements by having a plurality of rubber layers "stacked," i.e. one behind the other in location but connected so as to function in parallel. By this I mean that each layer, element or section assumes a proportional share of the load, all receiving the same deflection, and the layers are arranged one behind the other but still connected in parallel along the major axis of the mount rather than side by side. Where the layers are rubber sandwiches, for example, the deflections are equal on each of the sandwiches and this deflection is equal to the deflection across the complete mount assembly. In other words, the load is divided proportionately in accordance with the relative stiffness of the layers or elements in compression.

This tandem arrangement might be described as an arrangement where the area of the rubber springs is split up into a plurality of planes, while keeping the elements connected in parallel configuration, and thereby the overall dimensions of the mount are kept within the desired envelope of the space for the mount.

Referring to the simple form of side mount shown in FIGS. 1 and 2 and the diagram of FIG. 3, it will be noted that I prefer to put a side mount 1, 2 at each side of the engine 3. The curved arrow in FIG. 3, turning in the clockwise direction, shows the assumed direction of rotation of the propeller. The resultant force from the engine to be resisted by each mount is normally unidirectional because the torque is so much greater than the gravity force. Therefore the mount 1 at the left of the engine mus resist a counterclockwise force, i.e. a force in the direction of gravity, while the mount 2 at the right of the engine is set to resist a force opposite to gravity. In the drawings other than FIG. 3, wherevere a side mount is shown it is set to resist a force from the engine in the direction of gravity, as in the case of mount 1. Mount 2 is merely installed inverted as compared to mount 1 and the description in the specification. (See FIG. 3.)

Taking side mount 1 as shown in FIGS. 1 and 2, there is an upper rubber element 4 and a lower rubber element 5. There are at least two load-carrying surfaces provided which are rigidly related to each other and which fasten to the airplane engine and move with it. Alternated in line with them are at least two load-carrying surfaces fastened to the structure of the airplane. The rubber sandwiches, i.e. the rubber elements 4 and 5, are mounted between the engine and plane load-carrying surfaces so as to take the load in compression, as will now be described in more detail. The main frame of the mount comprises a front plate 6, a back piece 7 and upper and lower floors 8 and 9 unitary with the back piece. The upper rubber element 4 is located within this main frame, while the lower rubber element 5 extends downwardly from the lower floor 9. The front plate 6 is fastened to the upper and lower floors 8, 9 by bolts 10. There are bolt holes 11 in the back piece 7 to fasten the mount to the engine 3. There is a lateral extension 12 on the back piece but it is not part of my invention. It will be seen that the upper rubber element 4 does not extend quite to the front plate 6 at 13, the purpose of this being to provide room for expansion in the main frame when the rubber is compressed. The hole 14 in the rubber is for the same purpose.

To provide the connection or load-carrying surface to the airplane from the upper rubber element 4, there is a metal insert 15 passing through the rubber with surfaces parallel to the floors 8, 9, i.e. with its principal axis in the fore-and-aft direction of the engine as the mount is shown in FIG. 3. Through the center of the insert passes a longitudinal bolt 16. There is a small rubber compression pad 17 on the inside of the front plate 6 to protect the inert 15 against metal-to-metal contact if there is lateral movement when the parts move relatively to each other. They provide variable stiffness in one direction perpendicular to the main axis of the mount to supplement the shear action of the rubber.

On the lower face of the lower rubber element 5 is fastened a bar or lower mount fixture 18 corresponding to the insert 15, and through it passes a bolt 19. Coming down along each side of the mount, i.e., on the fore-and-aft faces as mounted, is a saddle 20 connected to the structure of the airplane. This saddle is rigidly attached to the mount through the bolts 16 and 19 to the insert 15 and fixture 18.

It will be seen that when the engine is turning the mount 1 at the left of the engine as viewed from the rear in FIG. 3, there is downward rubber pressure on the insert 15 and fixture 18. This compresses the upper and lower rubber elements equally and they divide the load in tandem. In this way I provide room for the large compression members needed to take the large load and still keep the whole mount small enough to fit into the space allotted. Stated another way, these side mounts must be stiff in the vertical direction to limit the torque deflection and keep it low while maintaining adequate isolation. As will be explained later, the deflections at the other mount points will also be small because of the fact that the rubber, acting in the major stiffness axis, is in compression, giving the rubber a snubbing characteristic in that direction.

It will be noted that the metal insert 15 is separated from the lower floor by a rubber pad 66. This rubber pad is bonded to only one surface which is in this case the floor 9. Under torque loading the lower floor 9 moves away from the insert 15 and since there is no bond on the surface of the rubber pad facing the insert 15, no resistance to this torque motion is offered by the pad. When the mount is under load in the reverse torque direction the pad goes into compression thereby preventing metal-to-metal contact as the lower floor moves toward the insert. The pad also acts as a motion-limiting device for reverse torque movement because of its increased stiffness under heavy load.

The fore-and-aft load is taken out by a top mount 21 at the rear mount plane (see FIG. 3). This load is composed of the fore-and-aft engine thrust loads and any fore-and-aft engine inertial loads which may exist. I also provide a top mount 22 at the forward engine mounting plane to take out forces in the vertical direction and in the side direction. This mount takes out very little torsion or thrust. The major forces on this forward mount are due to inertia loads caused by maneuvering of the airplane, as well as those due to gravity.

I will now describe the basic features of the top thrust mount 21. These are shown in the embodiment of FIGS. 7 and 8. As in the case of the side mounts 1, 2, there are a plurality of rubber layers arranged one behind the other in the direction of the main axis of the mount but connected so as to act in parallel. The mount is adapted to take out in compression of the rubber any major forces at right angles to the compression directions of the side mounts. The side mounts 1, 2 and the top or thrust mount 21 support the engine in compression in all the major directions. At the right of FIG. 7 is a steel engine pad 23 lying on the engine and connecting the mount to it by means of bolts which go in bolt holes 24. The connection to the airplane structure is through a saddle fitting 25 opposite the engine pad.

The space available for this mount is relatively large in the fore-and-aft direction and in the side direction but is very restricted in the vertical direction. In order to limit the stresses in the rubber, therefore, I spread the rubber area sideways and stack my load-carrying elements in the fore-and-aft direction. The mechanical connections to each element place an equal deflection on each element corresponding to the deflection of the engine pad 23 relative to the saddle fitting 25. In this way each element works in parallel with the other elements. The advantage which is gained by stacking in the main axis of the mount and making the mechanical connections in parallel is that the mount can be shorter and narrower for the same rubber stresses. It will be noted that by working in this dimension the loads are kept close to the main structural attachment, the load moment arms are small, and the bending moments small. The engine pad 23 and the saddle fitting 25 are the full width of the mount. Projecting from each such member toward the opposite member are a series of blades 26, 27. The blades 26 of the engine pad 23 are alternated with the blades 27 of the saddle fitting 25 and the rubber element is a sheet folded back and forth between these alternate blades. The blades lie across the fore-and-aft axis of the engine. This produces layers of rubber 28 which cover the long sides of each blade when seen in cross-section. Beyond the end of each blade is a rubber portion 29, 30 covering the end, the portion 29 being at the upper ends of the legs and the portion 30 at the lower ends. I provide that the stiffnesses in the vertical and lateral directions are as low as possible and the stiffness in the fore-and-aft direction as high as possible, consistent with proper isolation. In this embodiment the walls or blades 26, 27 are shown of tapered thickness in cross-section, but these walls can be of uniform thickness if desired.

It is sometimes preferable to provide a member going into all the folds of the alternated blades with the member as a separation between the rubber and the blades on one side. In FIG. 12 I have shown a thin metal separation member 33 between the airplane structure pad 34 and the rubber 35. In a device of this kind I prefer to have a bond to metal on each side of the rubber. It is difficult to bond it directly to both the engine pad and the structure pad simultaneously. The separation member 33 obviates this difficulty.

It will be noted that in the construction of FIGS. 7 and 8, holes 31 are provided in the rubber at the opposite ends of the blades 26, 27. I have shown them at both top and bottom folds in this embodiment. There are two purposes in having the holes in the rubber. The primary purpose of the holes is to reduce the stiffness of the mount in the direction of compression at the bottom of the U. The removal of rubber reduces compression in this direction. The second reason for having holes at these locations is to allow a smoother transition from compression on one side of the U to tension on the other side when there is a fore-and-aft thrust movement. This smoother transition minimizes stress concentration. I find that having some rubber beyond the ends of the blades ensures obtaining maximum stiffness in the direction of the major axis, namely, the fore-and-aft direction.

From the simple forms of the mounts and their arrangement in the suspension, some of the broad principles of my invention will be obvious. In the first place, a certain absolute stiffness is necessary in order to support the extremely heavy load. In the second place, the rubber must also have a relative stiffness low enough also to take care of isolating low frequency vibrations. In order to compromise these two requirements I have found that several things are necessary. I have found that the amount of rubber necessary can be minimized if the suspension is arranged so that all the major forces are handled by rubber in compression. To do this I so build and instal the mounts that each is practically unidirectional and operates in shear in directions at right angles to the major axis or axes of that mount. The major axis of the mount is the axis in which the mount takes the load in compression. Since there is only a limited area laterally from the axis of the load, I have arranged layers of rubber in tandem in the direction of the axis of the load to take the load in parallel. This ensures that the rubber can have a low enough stress to be effective over the entire range of accepted loads, and the highest stiffness to limit movement has been obtained consistent with good isolation. This minimum amount of movement is important to reduce the amount of movement of the engine relatively to the airplane. It will be seen that my construction with the elements taking the load in parallel is valuable in allowing an increase in load-carrying area in a direction where space is available. The rubber elements are connected in parallel but envelope considerations dictate a special relative placement. They are one behind the other considering the direction of the load. Furthermore it is also more efficient structurally because the dimensions at right angles to the direction of the force are smaller, thereby lessening the bending moment necessary to bridge these dimensions and which has to be imposed on the structure.

I will now describe the preferred form of side mount as shown in FIGS 4, 5 and 6. This mount has an improved form of rubber element and adds damping and snubbing features not present in the form shown in FIGS. 1 and 2. The diagram of FIG. 3 also applies to FIGS. 4, 5 and 6.

The side mount is still designed to take care of the torque situation. It has a front plate 36, a back piece 37 and upper and lower floors 38, 39 fastened thereto by bolts 40, 41. The lower floor 39 is united to the front plate and back piece by bolts 41 which go all the way through and project beyond the back piece available to connect to the engine. The upper floor 38 has the front plate fastened to it by a single central bolt 40. There are two corner bolts 40' at the upper ears or corners 42 of the upper floor which serve to hold the mount to the engine.

Since the side mount is designed to handle forces in one direction, i.e. it is substantially unidirectional, I can disregard the compression stiffness versus shear stiffness ratio. On the other hand, the vibration isolation requirements and engine motion requirements predetermine the compression stiffness requirements. For the purpose of fitting these requirements with the optimum properties of rubber in the medium durometer rubbers, I prefer to use bulge-restraining intermediate plates 44 in the upper and lower rubber elements 45, 46 in this mount (see FIGS. 4 and 5). This medium durometer rubber has greater tensile strength, gives greater elongation and better bonding possibilities. The plates are spaced in the rubber elements in planes preferably at right angles to the major axis of this unidirectional mount.

As can be seen in FIG. 4, in this preferred embodiment a damper has been added to the load-carrying block which is the upper rubber element 45. There is no need for a damper on the lower load-carrying block or element 46. The damper comprises two friction plates or mats 47, one on the inner side of the front plate 36 and the other on the back piece 37 facing the block. The damper is opposite the lower end of the upper load-carrying element, i.e. opposite the insert 48 which connects the upper block to the airplane structure. A metal-faced rubber compression pad 49 extends laterally from the rubber at insert 48 on each side and presses against its friction mat 47. It contains holes 55 to reduce the rubber stiffness on compression. This structure is adapted to take out forces in the lateral direction and to dampen motions in the vertical or major axis direction. The manner in which it functions to limit transient vertical motions of the engine due to shock loadings on the aircraft, etc. is as follows. The rubber compression pads 49 have such a section that they will move in shear in the vertical and fore-and-aft directions when subjected to forces which are less than the friction forces between the metal surface of the rubber pads and the friction mats 47. When the motions in the vertical direction, or in the fore-and-aft direction, become so large that the spring forces exceed the friction forces of the damper, then the metal surfaces of the pads will move on their friction mats and thereby absorb some of the vibratory energy. Thus there is damping action for the following motions: torsion about the engine center line, pitching of the engine in a vertical plane, and translation of the engine in a vertical direction and in the fore-and-aft direction.

I have also added to the mount of FIGS. 4, 5 and 6, structure which provides snubbing. The main function of snubbing is to limit engine motions to prevent metal-to-metal contact in the mounts and to alleviate engine control linkage problems under maneuvering conditions of the aircraft. I have surrounded the load-carrying rubber elements 45, 46 with rubber snubbers in such a manner that the functions of several parts have been combined and undue complications avoided. For example, I provide snubbing in the fore-and-aft direction for extreme deflections in both the forward and the backward directions by a construction which can be seen best in FIG. 5. The dotted lines at the lower part of the mount represent the inner edge of the saddle 50 which attaches the mount to the airplane structure by bolting to the steel insert 48 and lower fixture 52, as before. It will be noted that the rubber of the lower rubber block or element extends upwardly along the front and back vertical edges of the lower floor 39 to make rubber covers 51. It will be seen that in fore-and-aft loading of these side mounts the rubber will move in shear until the rubber covers 51 strike the saddle 50. This snubs the load-carrying elements.

The ability to snub under extreme torque conditions also involves the saddle. The lower floor 39 of the mount is wider than the main part of the rubber lower load-carrying element and the lower mount fixture 52 of this embodiment. Consequently, by making the rubber from the main lower block to the floor 51 continuous, I obtain horizontal rubber surfaces 53 along the bottom face of the lower floor where it extends beyond the block. I then put a kink 54 in the saddle so that it underlies these rubber surfaces 53 for an appropriate distance (see FIGS. 5 and 6). Under extreme torque the rubber surfaces 53 snub against the saddle kinks 54. In this way snubbing is obtained in both the principal directions needed, without the introduction of additional parts.

In FIGS. 9, 10 and 11, I show another form of the top thrust mount. This embodiment is like the embodiments of FIGS. 7 and 8 and FIG. 12 in that it has an engine thrust pad 56, a saddle 57 to attach the mount to the airplane, blades 58, 59 on the pad and saddle, rubber layers 60, holes 61 in the rubber at the engine pad end, and separation means to take the place of the separation member 33 of FIG. 12. It will be noted that the blades are of uniform thickness rather than tapered toward the end as in the embodiment of FIGS. 7 and 8 and FIG. 12. In consequence, the rubber layers 60 which are stacked are in parallel planes perpendicular to the fore-and-aft direction. In this embodiment, in place of using round holes at the top folds of the rubber, a thin space 65 is left between the rubber and the saddle (see FIG. 9). In place of the unitary separation member 33 of FIG. 12, individual or separate U-shaped plates 62, 64 are used. These do not extend around the top folds of rubber and are individually bolted to the blades 58 of the saddle 57 by bolts 63. I do not claim these individual plates as my invention insofar as they differ from FIGS. 7 and 12.

It will be seen that the side mounts and thrust mounts take the forces in the direction of their single major axis in compression, and forces at right angles thereto in shear, with lateral forces on the side mounts being taken in compression also. Thus the top mount of FIGS. 9–11 takes thrust in compression and torque in shear. The same is true of the top mounts of FIGS. 7, 8 and 12. The torque side mounts of FIGS. 1–6, on the other hand, take torque in compression and thrust in shear. The stiffness in compression can be kept low enough to catch a wide range of vibrating forces and yet limit the maximum movement of the mounts so that the shocks are taken substantially entirely in compression. This saves wear on the rubber and reduces the size of mounts required.

What I claim is:

1. An airplane engine suspension system including an engine frame and an engine, in combination with a vibration isolation suspension for mounting the engine on the frame by mounts arranged in two parallel mounting planes transverse to the fore and aft axis of the engine, said mounts comprising first and second type rubber mounts arranged between the engine frame and the engine and in said mounting planes, each of said second type mounts having its rubber arranged to take in compression substantially without the aid of rubber in shear the forces in the direction of the main axis of the mount, each of said mounts being adapted to take in shear forces imposed thereon at right angles of the mount, the rubber in the mounts of the first type each containing rubber elements connected together to function physically one behind the other in parallel in the direction of the main axis of the mount, the main axis of each such mount being set to resist the torque of the engine by compression of the rubber elements in the direction of the main axis of the mount, and the second type mounts being mounted on the engine frame to take in compression the forces taken in shear by said first type mounts, whereby each of said mounts is relieved of taking any major force in the major axis of the mount in shear and the mounts are short and narrow.

2. An airplane suspension system as defined in claim 1 wherein said mounts include at least two similar mounts of the first type located at the two sides of said engine for resisting vertical forces and torque imposed thereon by said engine, the mount on one side of said engine being upside down with respect to the mount at the other side thereof, the rubber elements in said mounts connected so that the deflection of each rubber element corresponds to the deflection of the engine relative to the airplane on which said engine is mounted, and wherein said rubber elements are placed one behind the other in the direction of the main axis of each of said mounts, whereby said mounts cooperate in resisting torque by compression of said rubber elements.

3. An airplane suspension system as defined in claim 2 wherein the forces taken in compression by said first type of mounts give said engine torsional support about its fore and aft axis, and wherein each of said first type of mounts has at least two load-carrying surfaces rigidly related to each other and fastened to the airplane and arranged alternately in line with the engine and longitudinally of said mount, whereby when the engine and airplane move toward each other the loads in a direction along the main axes of said first type of mounts are taken in compression by the said plurality of rubber elements thereof and a large spring rate is maintained in said direction.

4. An airplane suspension system as defined in claim 1, wherein each of the second type mounts is mounted on the engine frame with its main axis in the fore and aft direction of the engine, and wherein each of said second type mounts includes a plurality of rubber elements connected together to function in parallel in the direction of the main axis of said mount, the said rubber elements being located one behind the other in the direction of said axis.

5. An airplane suspension system as defined in claim 4 wherein the direction of the forces taken by compression by said first type mounts is vertical, and wherein each of said first type mounts has at least two load-carrying surfaces rigidly related to each other and fastened to the airplane, one of said load-carrying surfaces being adjacent the engine frame, and wherein a compression pad is interposed between said one load-carrying surface and said engine frame to prevent direct contact therebetween when said load-carrying surface and said engine frame move relatively to each other laterally of the main axis of said first type mount.

6. An airplane suspension system as defined in claim 5 wherein the said two or more rubber elements between a load-carrying surface and the engine frame are separated from each other when the engine has received torsional support from said first type mount but are otherwise in contact, whereby the said adjacent rubber elements act as a snubbing sandwich in case the engine has a reverse torque movement but do not add tension or stiffness in case of a torque movement.

7. An airplane suspension system as defined in claim 5 wherein the engine is mounted on the engine frame by mounts of said first type and second type mounted in said two parallel mounting planes, and wherein there are sliding friction surfaces between a load-carrying surface adjacent the engine frame and said compression pad, said sliding friction surfaces serving to dampen excessive movement in the direction of the main axis of said first type of mount.

8. An airplane suspension system as defined in claim 1 in which the two parallel mounting planes are vertical, and wherein the mount in the forward mounting plane is at the centre top of the engine and is responsive to vertical and lateral forces and acts in compression when such forces are imposed thereon and acts in shear when subjected to thrust, whereby the main forces imposed upon the mount in said forward mounting plane are due to gravity or inertia loads imposed on said mount by the maneuvering of the airplane.

References Cited in the file of this patent

UNITED STATES PATENTS

| | | |
|---|---|---|
| 1,578,673 | Masury et al. | Mar. 30, 1926 |
| 1,817,633 | Lovejoy | Aug. 4, 1931 |
| 1,824,732 | Paton | Sept. 22, 1931 |
| 1,857,168 | Steiner et al. | May 10, 1932 |
| 1,871,376 | Keys | Aug. 9, 1932 |
| 2,119,027 | Rondelle | May 31, 1938 |

FOREIGN PATENTS

| | | |
|---|---|---|
| 514,752 | Great Britain | Nov. 16, 1939 |
| 662,688 | Great Britain | Dec. 12, 1951 |